(12) United States Patent
Södergard et al.

(10) Patent No.: US 8,071,690 B2
(45) Date of Patent: Dec. 6, 2011

(54) LACTIC ACID BASED COMPOSITIONS WITH ENHANCED PROPERTIES

(75) Inventors: Anders Södergard, Turku (FI); Mikael Stolt, Turku (FI); Geoffrey A. R. Nobes, Decatur, IL (US)

(73) Assignee: Tate & Lyle Ingredients Americas LLC, Decatur, IL (US)

( * ) Notice: Subject to any disclaimer, the term of this patent is extended or adjusted under 35 U.S.C. 154(b) by 30 days.

(21) Appl. No.: 12/355,033

(22) Filed: Jan. 16, 2009

(65) Prior Publication Data

US 2009/0275706 A1    Nov. 5, 2009

Related U.S. Application Data

(60) Provisional application No. 61/022,892, filed on Jan. 23, 2008.

(51) Int. Cl.
  *C08G 63/91* (2006.01)
(52) U.S. Cl. ........ 525/411; 525/408; 525/410; 525/415; 525/437; 525/450; 525/454
(58) Field of Classification Search .................. 525/450, 525/408, 437, 410, 411, 415, 454
  See application file for complete search history.

(56) References Cited

U.S. PATENT DOCUMENTS

| | | | | |
|---|---|---|---|---|
| 5,834,582 | A | 11/1998 | Sinclair et al. | 528/354 |
| 5,908,918 | A | 6/1999 | Chen et al. | 528/354 |
| 6,495,631 | B1 | 12/2002 | Randall et al. | 525/186 |
| 6,803,443 | B1 | 10/2004 | Ariga et al. | 528/354 |
| 2005/0107505 | A1* | 5/2005 | Shinoda et al. | 524/321 |
| 2006/0009609 | A1 | 1/2006 | Hayes | 528/272 |
| 2006/0009610 | A1 | 1/2006 | Hayes | 528/272 |
| 2006/0009611 | A1 | 1/2006 | Hayes | 528/272 |

FOREIGN PATENT DOCUMENTS

| | | |
|---|---|---|
| DE | 43 00 420 | 7/1994 |
| DE | 199 39 403 | 2/2001 |
| EP | 0 899 274 A1 | 3/1999 |
| EP | 1 473 324 | 11/2004 |
| FI | 953655 | 2/1997 |
| JP | 8245866 | 9/1996 |
| JP | 064379 | 3/2001 |
| JP | 036179 | 2/2005 |
| JP | 96845 | 3/2006 |
| WO | WO92/22599 | 12/1992 |
| WO | WO93/13154 | 7/1993 |
| WO | WO94/07941 | 4/1994 |
| WO | WO95/18169 | 7/1995 |
| WO | WO02/16468 | 2/2002 |
| WO | WO02/076232 | 10/2002 |
| WO | WO03/089492 | 10/2003 |
| WO | WO03/089493 | 10/2003 |
| WO | WO03/099910 | 12/2003 |
| WO | WO2006/010061 | 1/2006 |
| WO | WO2006/053936 | 5/2006 |
| WO | WO2007/037673 | 4/2007 |
| WO | WO2007/099056 | 9/2007 |

OTHER PUBLICATIONS

Choi et al., *J. Appl. Polym. Sci.* 86:1892-1898 (2002).
Grijpma et al., *Makromol. Chem., Rapid Commun.* 14:155-161 (1993).
Hiljanen-Vainio et al., *Macromol. Chem. Phys.* 197:1503-1523 (1996).
Ljungberg et al., *J. Appl. Polym. Sci.* 88:3239-3247 (2003).
Ma et al., *Poly. Mater. Sci. Eng.*, pp. 527-528 (1997).
Martin et al., *Polymer* 42:6209-6219 (2001).
Quynh et al., *Eur. Polym. J.* 43:1779-1785 (2007).
PCT/US2009/031523 International Search Report (Apr. 29, 2009).

* cited by examiner

*Primary Examiner* — David W Wu
*Assistant Examiner* — Robert Jones, Jr.
(74) *Attorney, Agent, or Firm* — Williams, Morgan & Amerson, P.C.

(57) ABSTRACT

A crosslinked lactic acid polymer composition containing (i) a macromer comprising (i-a) a flexible segment produced by the condensation of two or more compounds selected from the group consisting of lactones, furans, epoxies, isocyanates, anhydrides, dianhydrides, alcohols, diols, triols, carboxylic acids, dicarboxylic acids, tricarboxylic acids, esters, diesters, triesters, ethers, diethers, and triethers; and (ii) a lactic acid polymer produced by the condensation of a lactic acid monomer or dimer selected from the group consisting of D-lactic acid, L-lactic acid, D,L-lactic acid, L,L-lactide, D,D-lactide, and D,L-lactide; wherein the macromer and the lactic acid polymer contain carbon-carbon single-bond crosslinks. The macromer may further contain (i-b) a lactic acid segment produced by the condensation of a lactic acid monomer or dimer selected from the group consisting of D-lactic acid, L-lactic acid, D,L-lactic acid, L,L-lactide, D,D- lactide, and D,L-lactide with a polyfunctional monomer selected from the group consisting of dianhydrides, diols, triols, dicarboxylic acids, and tricarboxylic acids. Also, methods of producing the polymer composition.

7 Claims, No Drawings

LACTIC ACID BASED COMPOSITIONS WITH ENHANCED PROPERTIES

This application claims priority from U.S. provisional patent application Ser. No. 61/022,892, filed on Jan. 23, 2008, which is incorporated herein by reference.

BACKGROUND OF THE INVENTION

The present invention relates to the field of lactic acid polymers.

SUMMARY OF THE INVENTION

In one embodiment, the present invention relates to a crosslinked lactic acid polymer composition containing (i) a macromer comprising (i-a) a flexible segment produced by the condensation of two or more compounds selected from the group consisting of lactones, furans, epoxies, isocyanates, anhydrides, dianhydrides, alcohols, diols, triols, carboxylic acids, dicarboxylic acids, tricarboxylic acids, esters, diesters, triesters, ethers, diethers, and triethers; and (ii) a lactic acid polymer produced by the condensation of a lactic acid monomer or dimer selected from the group consisting of D-lactic acid, L-lactic acid, D,L-lactic acid, L,L-lactide, D,D-lactide, and D,L-lactide; wherein the macromer and the lactic acid polymer contain carbon-carbon single-bond crosslinks.

In one embodiment, the macromer further contains (i-b) a lactic acid segment produced by the condensation of a lactic acid monomer or dimer selected from the group consisting of D-lactic acid, L-lactic acid, D,L-lactic acid, L,L-lactide, D,D-lactide, and D,L-lactide with a polyfunctional monomer selected from the group consisting of dianhydrides, diols, triols, dicarboxylic acids, and tricarboxylic acids.

In one embodiment, the present invention relates to a method of producing a crosslinked lactic acid polymer composition by (a) condensing two or more compounds selected from the group consisting of lactones, furans, epoxies, isocyanates, anhydrides, dianhydrides, alcohols, diols, triols, carboxylic acids, dicarboxylic acids, tricarboxylic acids, esters, diesters, triesters, ethers, diethers, and triethers, to yield a flexible segment of a macromer; and (b) melt blending the macromer with a lactic acid polymer, to yield the crosslinked lactic acid polymer.

In one embodiment, the method further involves (c) condensing a lactic acid monomer or dimer selected from the group consisting of D-lactic acid, L-lactic acid, D,L-lactic acid, L,L-lactide, D,D-lactide, and D,L-lactide with a polyfunctional monomer selected from the group consisting of dianhydrides, diols, triols, dicarboxylic acids, and tricarboxylic acids, to yield a lactic acid segment; and (d) condensing the lactic acid segment and the flexible segment, to yield the macromer.

DESCRIPTION OF ILLUSTRATIVE EMBODIMENTS

In one embodiment, the present invention relates to a crosslinked lactic acid polymer composition containing (i) a macromer comprising (i-a) a flexible segment produced by the condensation of two or more compounds selected from the group consisting of lactones, furans, epoxies, isocyanates, anhydrides, dianhydrides, alcohols, diols, triols, carboxylic acids, dicarboxylic acids, tricarboxylic acids, esters, diesters, triesters, ethers, diethers, and triethers; and (ii) a lactic acid polymer produced by the condensation of a lactic acid monomer or dimer selected from the group consisting of D-lactic acid, L-lactic acid, D,L-lactic acid, L,L-lactide, D,D-lactide, and D,L-lactide; wherein the macromer and the lactic acid polymer contain carbon-carbon single-bond crosslinks.

In one embodiment, the macromer further comprises (i-b) a lactic acid segment produced by the condensation of a lactic acid monomer or dimer selected from the group consisting of D-lactic acid, L-lactic acid, D,L-lactic acid, L,L-lactide, D,D-lactide, and D,L-lactide with a polyfunctional monomer selected from the group consisting of dianhydrides, diols, triols, dicarboxylic acids, and tricarboxylic acids.

The lactic acid segment is produced by the condensation of a lactic acid monomer or dimer with a polyfunctional monomer. Techniques for condensation of a lactic acid monomer or dimer with a polyfunctional monomer will be discussed below.

A lactic acid monomer has the structure

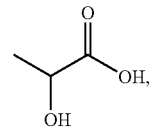

wherein the 2-carbon is chiral. Therefore, the lactic acid monomer or dimer is selected from the group consisting of D-lactic acid, L-lactic acid, D,L-lactic acid, L,L-lactide, D,D-lactide, and D,L-lactide.

The polyfunctional monomer is selected from the group consisting of dianhydrides, diols, triols, dicarboxylic acids, and tricarboxylic acids. A polyfunctional monomer which is branched, trifunctional, or both allows branching to occur within the growing macromer chain during condensation.

In one embodiment, the polyfunctional monomer is maleic anhydride.

The proportions of the lactic acid monomer or dimer and the polyfunctional monomer charged to the condensation are not critical and can be varied by the person of ordinary skill in the art depending on the compounds charged and the desired final properties of the macromer. In one embodiment, condensation is performed on from about 50 weight parts to about 100 weight parts D-lactic acid, L-lactic acid, D,L-lactic acid, or lactide with about 1 weight part maleic anhydride.

The reaction conditions and techniques for condensation of the lactic acid monomer or dimer and the polyfunctional monomer are also not critical. Any reactor known for polymerization of lactic acid homo- or copolymers can be used. In one embodiment, condensation involves contacting the D-lactic acid, L-lactic acid, D,L-lactic acid, or lactide with from about 0.02 weight parts to about 0.2 weight parts of a tin catalyst at a temperature from about 90° C. to about 130° C. A temperature of 110° C. has been found to be effective. In one embodiment, the tin catalyst is selected from the group consisting of tin(II) chloride and tin(II) octoate.

Continuing through this embodiment, the D-lactic acid, L-lactic acid, D,L-lactic acid, or lactide and the catalyst are contacted with maleic anhydride at a temperature from about 160° C. to about 220° C. and ambient pressure. A temperature of 190° C. has been found to be effective. The maleic anhydride can be added at a lower temperature, such as from about 90° C. to about 130° C., with subsequent heating to the temperature from about 160° C. to about 220° C. Gradual heating, over a time from minutes to hours, has been found to be effective. As the lactic acid monomer or dimer, the catalyst, and the maleic anhydride are kept at the temperatures and pressures referred to above, the lactic acid monomer or dimer and the maleic anhydride will condense, yielding water of reaction. The water of reaction can be collected by known techniques.

Further in this embodiment, the pressure in the reactor is reduced from ambient pressure to from about 50 mbar to about 200 mbar over from about 1 hr to about 6 hr, and then maintained at a pressure in the same range for about 30 min to about 5 hr. A final pressure of about 100 mbar after about 3 hr of pressure reduction, with maintenance at about 100 mbar for about 2 hr, has been found to be effective. The temperature can be maintained at from about 160° C. to about 220° C. during the pressure reduction and maintenance steps or it can be raised or lowered out of the range during either or both steps. Maintaining the temperature in the range from about 160° C. to about 220° C., such as about 190° C., has been found to be effective.

The result of the condensation of the lactic acid monomer or dimer and the polyfunctional monomer is the lactic acid segment which can be incorporated into the macromer (i).

The macromer (i) contains a flexible segment produced by the condensation of two or more compounds selected from the group consisting of lactones, furans, epoxies, isocyanates, anhydrides, dianhydrides, alcohols, diols, triols, carboxylic acids, dicarboxylic acids, tricarboxylic acids, esters, diesters, triesters, ethers, diethers, and triethers. In one embodiment, the flexible segment is produced by the condensation of reactants selected from the group consisting of adipic acid and 1,4-butanediol; adipic acid, 1,4-butanediol, and maleic anhydride; tetrahydrofuran and maleic anhydride; and ε-caprolactone and maleic anhydride.

In one embodiment, the flexible segment has the general formula:

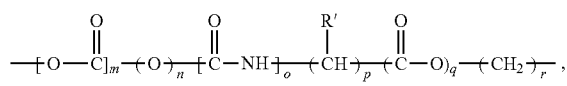

wherein m is an integer from 0 to 1, inclusive; n is an integer from 0 to 1, inclusive; o is an integer from 0 to 1, inclusive; p is an integer from 1 to 8, inclusive; q is an integer from 0 to 1, inclusive; r is an integer from 0 to 4, inclusive; and R' is selected from the group consisting of —H and —CH$_3$.

The proportions of the compounds charged to the condensation of the flexible segment are not critical and can be varied by the person of ordinary skill in the art depending on the compounds charged and the desired final properties of the flexible segment. In one embodiment, the flexible segment is produced by the condensation of from about 25 weight parts to about 75 weight parts adipic acid, from about 20 weight parts to about 60 weight parts 1,4-butanediol, and from about 5 weight parts to about 15 weight parts maleic anhydride.

In one embodiment, the flexible segment is condensed as follows. First, 1,4-butanediol and maleic anhydride are contacted in a reactor with a stabilizer and a catalyst at a temperature from about 90° C. to about 130° C. A temperature of about 110° C. has been found to be effective. In a further embodiment, the catalyst is dibutyl tin oxide in an amount from about 0.002 weight parts to about 0.05 weight parts and the stabilizer is trinonyl phenyl phosphate in an amount from about 0.005 weight parts to about 0.1 weight parts. Other catalysts and stabilizers can be used. The reactor contents are stirred until the maleic anhydride has completely melted.

Then, the 1,4-butanediol, the maleic anhydride, the stabilizer, and the catalyst are contacted with the adipic acid at a temperature from about 180° C. to about 240° C. and ambient pressure. A temperature of about 210° C. has been found to be effective. Gradual heating, over a time from minutes to hours, has been found to be effective. As the 1,4-butanediol, the maleic anhydride, the stabilizer, the catalyst, and the adipic acid are kept at the temperatures and pressures referred to above, the 1,4-butanediol, the maleic anhydride, and the adipic acid will condense, yielding water of reaction. The water of reaction can be collected by known techniques. Also, loss of the 1,4-butanediol can be monitored by observing the refractive index of the water of reaction collected from the reactor. If 1,4-butanediol is lost, additional 1,4-butanediol can be added.

Thereafter, the reactor's pressure is reduced from ambient pressure to from about 5 mbar to about 50 mbar over from about 1 hr to about 8 hr and its temperature is maintained at from about 180° C. to about 240° C. and the pressure from about 5 mbar to about 50 mbar for about 3 hr to about 24 hr. A final pressure of about 15 mbar and a temperature for both reducing and maintaining of about 210° C. have been found to be effective, as have a reduction duration of about 3.5 hr and a maintenance time of about 10 hr. A maintenance time of about 10 hr is usually sufficient to reduce the reactor's acid number to below about 7 mg KOH per g reactor contents.

In an embodiment wherein the macromer comprises both the flexible segment and the lactic acid segment, the segments can be condensed to yield the macromer (i) by any appropriate technique. The proportions of the segments charged to the condensation of the macromer are not critical and can be varied by the person of ordinary skill in the art depending on the compounds charged and the desired final properties of the macromer. In one embodiment, the macromer is the condensation product of from about 20 weight parts to about 80 weight parts lactic acid segment with about 20 weight parts to about 80 weight parts flexible segment.

In one embodiment, condensation of the macromer involves the following. First, the lactic acid segment is contacted in the reactor with the flexible segment and a stabilizer at a temperature from about 160° C. to about 220° C. and ambient pressure. This can be performed by adding prepared flexible segment to freshly-prepared lactic acid segment. A temperature of about 190° C. has been found to be effective. In a further embodiment, the stabilizer is phosphoric acid in an amount from about 0.1 weight parts to about 0.75 weight parts.

Then, the reactor's pressure is reduced from ambient pressure to from about 5 mbar to about 25 mbar over from about 1 hr to about 6 hr and its temperature is maintained at from about 160° C. to about 220° C. and its pressure at from about 5 mbar to about 25 mbar for about 8 hr to about 72 hr. A temperature of about 190° C. and a final pressure of about 10 bar, reached after about 2.5 hr, has been found to be effective. A maintenance time of from about 6 hr to about 20 hr has been found to be effective in bringing the acid number either to below about 28 mg KOH per g reactor contents or to a substantially constant value (i.e., a value varying by no more than about ±1 mg KOH per g reactor contents within one hour).

In addition to the flexible segment and the lactic acid segment, if any, other segments, comprising such compounds as saturated or unsaturated di- or trifunctional acids, anhydrides, alcohols, esters, or ethers, as well as epoxies or isocyanates, can be included in the formulation in order to adjust the reaction ratio between the two primary segments, to introduce branched structures, or both.

The lactic acid polymer (ii) can be any lactic acid polymer containing at least about 90 mol % lactic acid units known in the art. In one embodiment, the lactic acid polymer is a linear polylactide. In one embodiment, the lactic acid polymer is a high molecular weight polylactide. In a further embodiment, the lactic acid polymer is a linear, high molecular weight polylactide. Exemplary lactic acid polymers have a number average molecular weight (Mn) from about 35,000 g/mol to about 120,000 g/mol, such as from about 40,000 g/mol to about 60,000 g/mol; a residual lactide content from about 0.05 wt % to about 1.0 wt %, such as from about 0.5 wt % to about 0.6 wt %; a residual water content from about 50 ppm to about 200 ppm, such as from about 100 ppm to about 140 ppm; and a meso-lactide content from about 2.0 mol % to about 15.0 mol %, such as from about 3.0 mol % to about 6.0 mol %.

Crosslinking of the macromer (i) and the lactic acid polymer (ii) can be achieved by any technique that leads to formation of carbon-carbon single-bond crosslinks between the macromer and the lactic acid polymer. The crosslinked macromer (i) and lactic acid polymer (ii) can be branched but are not required to be. "Carbon-carbon single-bond crosslink" means that an addition reaction between a carbon engaged in a double bond in a macromer molecule and a carbon engaged in a double bond in a lactic acid polymer molecule has taken place. Also, intrachange or interchange reactions may take place which yield branched and crosslinked structures.

Crosslinking can also comprise bond formation between two or molecules of the macromer or two or more molecules of the lactic acid polymer.

In one embodiment, the crosslinked lactic acid polymer composition comprises from about 10 weight parts to about 90 weight parts lactic acid polymer (ii) and from about 10 weight parts to about 90 weight parts macromer (i) and the macromer (i) and the lactic acid polymer (ii) together comprise 100 weight parts. In a further embodiment, the crosslinked lactic acid polymer composition comprises from about 60 weight parts to about 80 weight parts lactic acid polymer (ii) and from about 20 weight parts to about 40 weight parts macromer (i).

Generally, crosslinking of the macromer and the lactic acid polymer can be performed by melt blending the two materials. In one embodiment, melt blending is performed in the presence of a free radical initiator.

In one embodiment, melt blending involves the following. First, the lactic acid polymer is heated at a temperature from about 200° C. to about 240° C., to yield a melted lactic acid polymer. Thereafter, the macromer and a free radical initiator are added to the melted lactic acid polymer, to yield a melted blend.

Any free radical initiator can be used. In one embodiment, the free radical initiator is a peroxide. The amount of free radical initiator to be used is not critical and can be readily determined by the person of ordinary skill in the art. In one embodiment, the free radical initiator is present in an amount from about 0.1 weight parts to about 1 weight part.

Radically initiated reactions in polymers containing lactic acid condensates will most frequently occur at the carbon-proton next to the carbonyl group, resulting in branching or grafting at that point. Organic peroxides produce radicals with the same effect, and have been noticed to give long-chain branching when added to lactic acid polymer. By mixing the lactic acid polymer and the macromer in the melt phase and in the presence of a free radical initiator, such as peroxide, macroradicals are formed in both the macromer molecules and the lactic acid polymer. When the macromer contains unsaturated groups, the double bonds thereof will readily form macroradicals, which will combine either with other macromer macroradicals or with lactic acid polymer. Though not to be bound by theory, the pattern of substitution will depend on the accessibility of given reaction sites.

Next, the melted blend is maintained at a temperature from about 200° C. to about 240° C. for about 30 sec to about 10 min, to yield a mixture of the crosslinked lactic acid polymer, water, and residual free lactide.

The reaction mechanisms by which the preparation of crosslinked lactic acid polymer is believed to occur are the following. The first and most rapid reaction taking place is radical induction by the free radical initiator randomly in both the macromer and the lactic acid polymer. According to the randomness of the process, the number of formed reactive sites is likely to be higher in the component present in greater amount, typically the lactic acid polymer. The radicals in the lactic acid polymer chains can then recombine, react with macroradicals in the macromer, or react to a double bond in the macromer, all of which result in larger and branched macromolecules. In the case of radicals formed in the macromer, the outcome will be the same, but the formed macromolecule might have lower molar mass in the case of the macromer recombining with itself. The disappearance of the double bonds has later in the reaction has been observed by $^1$H-NMR measurements, which verified that radical reactions took place. Inter- and intramolecular transesterifications have been demonstrated to take place in lactic acid polymer melts and, though not to be bound by theory, it would be highly unlikely that transesterification reactions would occur preferentially or exclusively between the lactoyl units of the macromer, without involving the lactic acid polymer. Therefore, we conclude the second reaction taking place in crosslinking is transesterification, which in the crosslinked lactic acid polymer will result in drastic changes in the dispersion index compared to the lactic acid polymer. The dispersion index (Mw/Mn) of the crosslinked lactic acid polymer is typically above 10, such as from about 10 to about 70, from about 20 to about 60, or from about 30 to about 50, and the Mw/Mn is believed to increase as a function of melt-mixing time. Hence, the reactive blending will result in a completely new type of lactic acid based copolyester. The new copolyester can have an average number molar mass ($M_n$) below 10,000 Da, but still shows a good melt processability when $M_n$ is at such a level.

The residual free lactide can then be removed from the mixture, such as by the application of vacuum (e.g., less than about 20 mbar), to yield a mixture of the crosslinked lactic acid polymer and water.

Finally, the water can be removed from the mixture, such as by drying, the application of vacuum, or both, to yield the crosslinked lactic acid polymer. It is generally desirable to reduce the water content of the crosslinked lactic acid polymer to less than about 200 ppm. The crosslinked lactic acid polymer can be solidified and pelletized, if desired, and water removal can be performed either before or after pelletization.

Typical properties of the crosslinked lactic acid polymer are as follows: Mn from about 1,000 g/mol to about 80,000 g/mol, such as from about 5,000 g/mol to about 20,000 g/mol; residual lactide content from about 0.05 wt % to about 1.0 wt %, such as from about 0.5 wt % to about 0.6 wt %; residual water content from about 50 ppm to about 200 ppm, such as from about 100 ppm to about 140 ppm; and meso-lactide content from about 2.0 mol % to about 15.0 mol %, such as from about 3.0 mol % to about 6.0 mol %.

In addition to the crosslinked lactic acid polymer, crosslinked lactic acid polymer compositions can optionally contain additives. A stabilizer, such as phosphoric acid, can be included in the crosslinked lactic acid polymer composition as a stabilizer in order to deactivate tin-based catalysts, if any, used for macromer synthesis. Measured phosphorous levels in a lactic acid polymer are approximately 6 mg P/kg lactic acid polymer and in the crosslinked lactic acid polymer composition can be approximately 25 mg P/kg lactic acid polymer at high macromer content, extrapolated up to approximately 80 mg P/kg for 100% macromer. It should be noted that these values are the residual phosphorous content in the polymer. The actual amount of stabilizer needs to be calculated separately for each type of stabilizer used.

Tin-containing catalysts can be used in the preparation of both the lactic acid polymer and the macromer. The measured amount of tin is 4 mg Sn/kg lactic acid polymer and 13 mg Sn/kg high macromer content crosslinked lactic acid polymer. Extrapolation of the amount of tin corresponds to 35 mg Sn/kg for 100% macromer. Again, these are measured values of tin, and the actual amount of catalyst needs to be calculated separately for each type of catalyst used. In addition, it is unlikely that the measured tin in the crosslinked lactic acid polymer composition is present in the form in which it was added as catalyst but is probably in some other ligand or oxidation state (i.e., it is not likely to be residual catalyst).

The terminal groups on the polymers in the crosslinked lactic acid polymer composition are mainly hydroxyl or carboxylic acid groups.

The crosslinked lactic acid polymer composition can be identified by contacting the putative crosslinked lactic acid polymer composition with a solvent in which one of the polymers is soluble and the other is not; if less than 5 wt % of the soluble polymer is removed from the putative crosslinked lactic acid polymer composition, the crosslinked lactic acid polymer composition is indicated. In some situations, the crosslinked lactic acid polymer composition can be identified as having one glass transition temperature (Tgs) as measured by differential scanning calorimetry (DSC).

The reactive blending of the macromer with the lactic acid polymer component results in a crosslinked lactic acid polymer composition which can be subjected to standard processing methods including injection molding, extrusion blow molding, injection stretch blow molding and film blowing, in contrast to known lactic acid polymers. The crosslinked lactic acid polymer composition has greater flexibility, improved ductility, tunable barrier properties and improved melt processability than known lactic acid polymers.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Prepolymer 1.a: Hydroxyl-Terminated Prepolymer. A hydroxyl-terminated prepolymer was prepared by weighing 495.43 g 1,4-butanediol (Alfa Aesar, used as received), 129.21 g maleic anhydride (Alfa Aesar, used as received), 573 g adipic acid (Alfa Aesar, used as received), 0.2352 g trinonyl phenyl phosphite (TNPP) (Alfa Aesar, used as received), and 0.1060 g dibutyl tin oxide (DBTO) (Aldrich, used as received) into a stirred batch reactor, after which the reagents were dehydration condensation polymerised. The reaction mixture was slowly heated from 24° C. to 210° C. in ca. 18.5 h, after which the pressure was gradually lowered to 15 mbar in ca. 3.5 h. The reaction was continued under reduced pressure until a total reaction time of ca. 23 h was reached. The hydroxyl-terminated prepolymer did not show a Tg within the temperature range of −30-200° C., as determined by DSC.

Prepolymer 1.b: Carboxyl-Terminated Prepolymer. A carboxyl-terminated prepolymer was prepared by weighing 995.03 g L-lactic acid (Purac, 92% water solution, free water not removed), 15.45 g maleic anhydride (Alfa Aesar, used as received), 0.7536 g tin(II)chloride (Alfa Aesar, anhydrous, used as received) into a round-bottom flask, after which the reagents dehydration condensation polymerised under reduced pressure in a rotary evaporator unit. The reaction temperature was gradually increased to 190° C. The total reaction time was ca. 10.5 h. The resulting slightly yellow polymer showed a Tg of ca. 22° C., as determined by DSC.

Preparation of linked copolymer of Prepolymers 1.a and 1.b by Dehydration Condensation Polymerisation. Prepolymers 1.a and 1.b were mixed in a 50:50 w/w ratio in a round-bottom flask, and 0.13 w-% of phosphoric acid (J.T. Baker, used as received) was added. The mixture was dehydration condensation polymerised in a rotary evaporator unit under reduced pressure at 190° C. for ca. 23 h. The resulting slightly cloudy and yellowish polymer showed a Tg of ca. −17° C., as determined by DSC.

Example 2

Prepolymer 2.a: Hydroxyl-Terminated Prepolymer. A hydroxyl-terminated prepolymer was prepared by weighing 495.43 g 1,4-butanediol (Alfa Aesar, used as received), 129.21 g maleic anhydride (Alfa Aesar, used as received), 573 g adipic acid (Alfa Aesar, used as received), 0.2352 g trinonyl phenyl phosphite (TNPP) (Alfa Aesar, used as received), and 0.1060 g dibutyl tin oxide (DBTO) (Aldrich, used as received) into a stirred batch reactor, after which the reagents were dehydration condensation polymerised. The reaction mixture was slowly heated from 24° C. to 210° C. in ca. 18.5 h, after which the pressure was gradually lowered to 15 mbar in ca. 3.5 h. The reaction was continued under reduced pressure until a total reaction time of ca. 23 h was reached. The hydroxyl-terminated prepolymer did not show a Tg within the temperature range of −30-200° C., as determined by DSC.

Prepolymer 2.b: Carboxyl-Terminated Prepolymer.

A carboxyl-terminated prepolymer was prepared by weighing 995 g L-lactic acid (Purac, 92% water solution, free water not removed), 15.45 g maleic anhydride (Alfa Aesar, used as received), and 0.7527 g tin(II) chloride (Alfa Aesar, anhydrous, used as received) into a stirred batch polycondensation reactor, after which the reagents were dehydration condensation polymerised. The reaction temperature was 190° C. and it was reached in ca. 5 h. The pressure was lowered gradually to 100 mbar, and the total reaction time was ca. 10 h. The resulting slightly green coloured polymer showed a Tg of ca. 23° C., as determined by DSC.

Preparation of linked copolymers of Prepolymers 2.a. and 2.b. by Dehydration Condensation Polymerisation. The prepolymers 2.1. and 2.2. were mixed in a 50:50 w/w ratio in a round-bottom flask, and 0.14 w-% of phosphoric acid (J.T. Baker, used as received) was added. The mixture was dehydration condensation polymerised in a rotary evaporator unit under reduced pressure at 190° C. for ca. 12 h. The resulting slightly green coloured polymer showed a Tg of ca. −19° C., as determined by DSC.

Example 3

Prepolymer 3.a: Hydroxyl-Terminated Prepolymer. A hydroxyl-terminated prepolymer was prepared by weighing 297.02 g L-lactic acid (Purac, free water removed), 5.0729 g succinic anhydride (Aldrich, used as received), 16.4151 g inositol (Acros Organics, used as received), and 0.1603 g tin(II) chloride (Alfa Aesar, anhydrous, used as received) into a round-bottom flask, after which the reagents were dehydration condensation polymerised in a rotary evaporator unit under reduced pressure. The final reaction temperature was 155° C. and the total polymerisation time 24.5 h. The resulting clear and colorless hydroxyl-terminated prepolymer showed a Tg of ca. 35° C., as determined by DSC.

Prepolymer 3.b: Carboxyl-Terminated Prepolymer. A carboxyl-terminated prepolymer was prepared by weighing 200.05 g succinic acid (Alfa Aesar, used as received), 119.46 g 1,3-propanediol (Alfa Aesar, used as received), and 0.16 g stannous octoate (Alfa Aesar, technical grade, used as received) into a round-bottom flask. The reaction mixture was dehydration condensation polymerised under reduced pressure in a rotary evaporator unit for ca. 22 h. The reaction temperature was 155° C. and it was reached after ca. 1 h. The resulting brown-colored polymer did not show a Tg within the temperature range of −30-200° C., as determined by DSC.

Preparation of linked copolymers of Prepolymers 3.a and 3.b by Dehydration Condensation Polymerisation. The prepolymers 3.a and 3.b were mixed in a 50:50 w/w ratio in a round-bottom flask, and 0.14 w-% (J.T. Baker, used as received) and 0.02 w-% of tin(II)chloride (Alfa Aesar, used as received) were added. The mixture was dehydration condensation polymerised in a rotary evaporator unit under reduced pressure at 155° C. for ca. 19 h. The resulting polymer was slightly yellow and it had a rubbery texture. The linked product showed a Tg of ca. −2° C., as determined by DSC.

Example 4

Prepolymer 4.a: Hydroxyl-Terminated Prepolymer. A hydroxyl-terminated prepolymer was prepared by weighing 504.57 g L-lactic acid (Purac, free water removed), 8.6073 g maleic anhydride (Alfa Aesar, used as received), 27.88 g inositol (Acros Organics, used as received), and 0.27 g tin(II) chloride (Alfa Aesar, anhydrous, used as received) into a round-bottom flask, after which the reagents were dehydration condensation polymerised under reduced pressure in a rotary evaporator unit. The final polymerisation temperature, which was reached in ca. 2 h, was 155° C., and the total polymerisation time was ca. 24 h. The resulting clear and colorless hydroxyl terminated prepolymer showed a Tg of ca. 36° C., as determined by DSC.

Prepolymer 4.b: Carboxyl-Terminated Prepolymer. A carboxyl-terminated prepolymer was prepared by weighing 200.05 g succinic acid (Alfa Aesar, used as received), 119.46 g 1,3-propanediol (Alfa Aesar, used as received), and 0.16 g stannous octoate (Alfa Aesar, technical grade, used as received) into a round-bottom flask. The reaction mixture was dehydration condensation polymerised under reduced pressure in a rotary evaporator unit for ca. 22 h. The reaction temperature was 155° C. and it was reached after ca. 1 h. The resulting brown-colored polymer did not show a Tg within the temperature range of −30-200° C., as determined by DSC.

Preparation of linked copolymers of Prepolymers 4.a and 4.b by Dehydration Condensation Polymerisation. The prepolymers 4.a and 4.b were mixed in a 50:50 w/w ratio in a round-bottom flask, and 0.14 w-% (J.T. Baker, used as received) and 0.02 w-% of tin(II)chloride (Alfa Aesar, used as received) were added. The mixture was dehydration condensation polymerised in a rotary evaporator unit under reduced pressure at 155° C. for ca. 18.5 h. The resulting polymer was rubbery and slightly yellow coloured, and it showed a Tg of ca. −3° C., as determined by DSC.

Example 5

Prepolymer 5.a: Hydroxyl-Terminated Prepolymer. A hydroxyl-terminated prepolymer was prepared by weighing 495.45 g 1,4-butanediol (Alfa Aesar, used as received), 129.21 g itaconic acid (Fluka, used as received), 572.98 g adipic acid (Alfa Aesar, used as received), 0.24 g trinonyl phenyl phosphite (TNPP) (Alfa Aesar, used as received), and 0.1060 g dibutyl tin oxide (DBTO) (Aldrich, used as received) into a round-bottom flask after which the reagents were dehydration condensation polymerised under reduced pressure in a rotary evaporator unit. The final polymerisation temperature, which was reached in ca. 4 h, was 165° C. The total reaction time was ca. 23.5 h. The hydroxyl-terminated prepolymer was cloudy and whitish after cooling down, and it did not show a Tg within the temperature range −30° C.-200° C., as determined by DSC.

Prepolymer 5.b: Hydroxyl-Terminated Prepolymer. A hydroxyl-terminated prepolymer was prepared by weighing 548.44 g L-lactic acid (Purac, 92% water solution, free water not removed), 8.61 g itaconic acid (Fluka, used as received), 27.88 g inositol (Alfa Aesar, used as received), and 0.2709 g tin(II)chloride (Alfa Aesar, anhydrous, used as received) into a round-bottom flask, after which the reagents were dehydration condensation polymerised under reduced pressure in a rotary evaporator unit for ca. 24 h. The final reaction temperature, which was reached in ca. 1 h, was 155° C. The resulting clear and colorless hydroxyl terminated prepolymer showed a Tg of ca. 37° C., as determined by DSC.

Preparation of transesterified copolymers of Prepolymers 5.a and 5.b by Dehydration Condensation Polymerisation. The prepolymers from Example 2 and Example 6 were mixed in a 50:50 w/w ratio in a round-bottom flask, and 0.14 w-% (J.T. Baker, used as received) and 0.02 w-% of tin(II)chloride (Alfa Aesar, used as received) were added. The mixture was dehydration condensation polymerised in a rotary evaporator unit under reduced pressure at 155° C. for ca. 19 h. The resulting polymer was cloudy and slightly yellow, and very sticky and soft even after cooling down. The polymer did not show a Tg within the temperature range of −30-200° C., as determined by DSC.

Example 6

Prepolymer 6.a: Hydroxyl-Terminated Prepolymer. A hydroxyl-terminated prepolymer was prepared by weighing 495.43 g 1,4-butanediol (Alfa Aesar, used as received), 129.21 g maleic anhydride (Alfa Aesar, used as received), 573 g adipic acid (Alfa Aesar, used as received), 0.2352 g trinonyl phenyl phosphite (TNPP) (Alfa Aesar, used as received), and 0.1060 g dibutyl tin oxide (DBTO) (Aldrich, used as received) into a stirred batch reactor, after which the reagents were dehydration condensation polymerised. The reaction mixture was slowly heated from 24° C. to 210° C. in ca. 18.5 h, after which the pressure was gradually lowered to 15 mbar in ca. 3.5 h. The reaction was continued under reduced pressure until a total reaction time of ca. 23 h was reached. The hydroxyl-terminated prepolymer did not show a Tg within the temperature range of −30-200° C., as determined by DSC.

Prepolymer 6.b: Hydroxyl-Terminated Prepolymer. A hydroxyl-terminated prepolymer was prepared by weighing 548.44 g L-lactic acid (Purac, 92% water solution, free water not removed), 8.61 g itaconic acid (Fluka, used as received), 27.88 g inositol (Alfa Aesar, used as received), and 0.2709 g tin(II)chloride (Alfa Aesar, anhydrous, used as received) into a round-bottom flask, after which the reagents were dehydration condensation polymerised under reduced pressure in a rotary evaporator unit for ca. 24 h. The final reaction temperature, which was reached in ca. 1 h, was 155° C. The resulting clear and colorless hydroxyl terminated prepolymer showed a Tg of ca. 37° C., as determined by DSC.

Preparation of transesterified copolymer of Prepolymers 6.a. and 6.b. by Dehydration Condensation Polymerisation. The prepolymers 6.a and 6.b were mixed in a 50:50 w/w ratio in a round-bottom flask, and 0.14 w-% (J.T. Baker, used as received) and 0.02 w-% of tin(II)chloride (Alfa Aesar, used as received) were added. The mixture was dehydration condensation polymerised in a rotary evaporator unit under reduced pressure at 155° C. for ca. 22 h. The resulting polymer was cloudy and slightly yellow, and very sticky and soft even after cooling down. The polymer did not show a Tg within the temperature range of −30-200° C., as determined by DSC.

Example 7

Prepolymer 7.a: Hydroxyl-Terminated Prepolymer. A hydroxyl-terminated prepolymer was prepared by weighing 495.45 g 1,4-butanediol (Alfa Aesar, used as received), 129.21 g itaconic acid (Fluka, used as received), 572.98 g adipic acid (Alfa Aesar, used as received), 0.24 g trinonyl phenyl phosphite (TNPP) (Alfa Aesar, used as received), and 0.1060 g dibutyl tin oxide (DBTO) (Aldrich, used as received) into a round-bottom flask after which the reagents were dehydration condensation polymerised under reduced pressure in a rotary evaporator unit. The final polymerisation temperature, which was reached in ca. 4 h, was 165° C. The total reaction time was ca. 23.5 h. The hydroxyl-terminated prepolymer was cloudy and whitish after cooling down, and it did not show a Tg within the temperature range −30° C.-200° C., as determined by DSC.

Prepolymer 7.b: Carboxyl-Terminated Prepolymer. A carboxyl-terminated prepolymer was prepared by weighing 182.83 g 1,3-propanediol (Alfa Aesar, used as received), 277.18 g succinic acid (Alfa Aesar, used as received), 32.53 g itaconic acid (Fluka, used as received), and 0.2488 tin(II) chloride (Alfa Aesar, used as received) into a round-bottom flask, and dehydration polycondensation polymerising the reagents under reduced pressure at 155° C. in a rotary evaporator unit for ca. 24.5 h after this. The resulting light brown and very soft carboxyl-terminated prepolymer did not show a Tg within the temperature range of −30-200° C., as determined by DSC.

Preparation of linked copolymer of Prepolymers 7.a and 7.b by Dehydration Condensation Polymerisation. The prepolymers 7.a and 7.b were mixed in a 50:50 w/w ratio in a round-bottom flask, and 0.14 w-% (J.T. Baker, used as received) and 0.02 w-% of tin(II)chloride (Alfa Aesar, used as received) were added. The mixture was dehydration condensation polymerised in a rotary evaporator unit under reduced pressure at 155° C. for ca. 27 h. The resulting polymer was slightly yellow coloured and very soft and sticky. The polymer did not show a Tg within the temperature range of −30-200° C., as determined by DSC.

Example 8

Example 8.a

Reactively Blending the Linked Copolymer of Example 1 with Linear High-Molar Mass poly(L-lactide)

7.99 g of the linked copolymer of Example 1 was reactively blended with 32.00 g of linear high-molar mass poly(L-lactide) in a Brabender W50EHT 3-zone mixer at 190° C. for 5 minutes, after which the sample was retained and cooled under ambient conditions. The reactive blending was initiated using 0.14 g of Trigonox 301 peroxide (Akzo-Nobel, used as received). The sample obtained by reactive blending showed a $M_n$ of 3.8 kDa, $M_w$ of 112.4 kDa, and a $M_z$ of 295.6 kDa. The measured glass transition temperature was 48.2° C.

Example 8.b

Blending the Linked Copolymer of Example 1 with Linear High-Molar Mass poly(L-lactide)

8.03 g of the linked copolymer of Example 1 was blended with 32.00 g of linear high-molar mass poly(L-lactide) in a Brabender W50EHT 3-zone mixer at 190° C. for 5 minutes, after which the sample was retained and cooled under ambient conditions. The sample obtained by simple blending showed a $M_n$ of 2.2 kDa, $M_w$ of 75.5 kDa, and a $M_z$ of 192.9 kDa. The measured glass transition temperature was 49.6° C.

Example 9

Example 9.a

Reactively Blending the Linked Copolymer of Example 2 with Linear High-Molar Mass poly(L-lactide)

8.00 g of the linked copolymer of Example 2 was reactively blended with 32.00 g of linear high-molar mass poly(L-lactide) in a Brabender W50EHT 3-zone mixer at 190° C. for 8 minutes and small samples were attained at different time intervals during the reaction. After retaining the samples they were cooled under ambient conditions. The reactive blending was initiated using 0.14 g of Trigonox 301 peroxide (Akzo-Nobel, used as received). The measured glass transition temperature for a sample reactively blended for 1 minute was 47.9° C., for a sample reactively blended for 3 minutes was 47.2° C., and for a sample reactively blended for 5 minutes was 46.9° C.

Example 9.b

Blending the Linked Copolymer of Example 2 with Linear High-Molar Mass poly(L-lactide)

8.04 g of the linked copolymer of Example 2 was blended with 32.00 g of linear high-molar mass poly(L-lactide) in a Brabender W50EHT 3-zone mixer at 190° C. for 5 minutes, after which the sample was retained and cooled under ambient conditions. The measured glass transition temperature was 49.7° C.

Example 10

Example 10.a

Reactively Blending the Linked Copolymer of Example 3 with Linear High-Molar Mass poly(L-lactide)

8.00 g of the linked copolymer of Example 3 was reactively blended with 32.00 g of linear high-molar mass poly(L-lactide) in a Brabender W50EHT 3-zone mixer at 190° C. for 5 minutes, after which the sample was retained and cooled under ambient conditions. The reactive blending was initiated using 0.14 g of Trigonox 301 peroxide (Akzo-Nobel, used as received). The sample obtained by reactive blending showed a $M_n$ of 3.0 kDa and a $M_z/M_n$ of 95.1 indicating branching of high molar mass chains when compared to Example 10.b. The measured glass transition temperature was 53.2° C.

Example 10.b

Blending the Linked Copolymer of Example 3 with Linear High-Molar Mass poly(L-lactide)

8.00 g of the linked copolymer of Example 3 was blended with 32.00 g of linear high-molar mass poly(L-lactide) in a Brabender W50EHT 3-zone mixer at 190° C. for 5 minutes, after which the sample was retained and cooled under ambient conditions. The sample obtained by simple blending showed a $M_n$ of 3.6 kDa and a $M_z/M_n$ of 72.3. The measured glass transition temperature was 54.4° C.

Example 11

Example 11.a

Reactively Blending the Linked Copolymer of Example 4 with Linear High-Molar Mass poly(L-lactide)

8.00 g of the linked copolymer of Example 4 was reactively blended with 32.00 g of linear high-molar mass poly(L-lactide) in a Brabender W50EHT 3-zone mixer at 190° C. for 5 minutes, after which the sample was retained and cooled under ambient conditions. The reactive blending was initiated using 0.14 g of Trigonox 301 peroxide (Akzo-Nobel, used as received). The sample obtained by reactive blending showed a $M_w$ of 119.8 kDa and a $M_z$ of 276.5 kDa proving a reaction between the linear high molar mass poly(L-lactide) and the liked flexibilizer component of Example 4. Also the measured glass transition temperature of 51.9° C. was lower than for the sample of Example 11.b. A 0.5 mm thick film prepared from the sample had a Young's tensile modulus of 63% when compared to a film prepared from linear high-molar mass poly(L-lactide).

Example 11.b

Blending the Linked Copolymer of Example 4 with Linear High-Molar Mass poly(L-lactide)

8.00 g of the linked copolymer of Example 4 was blended with 32.00 g of linear high-molar mass poly(L-lactide) in a Brabender W50EHT 3-zone mixer at 190° C. for 5 minutes, after which the sample was retained and cooled under ambient conditions. The sample obtained by simple blending showed a $M_w$ of 87.9 kDa and a $M_z$ of 208.5 kDa. The measured glass transition temperature was 54.3° C. A 0.5 mm thick film prepared from the sample had a Young's tensile modulus of 81% when compared to a film prepared from linear high-molar mass poly(L-lactide).

Example 12

Example 12.a

Reactively Blending the Linked Copolymer of Example 5 with Linear High-Molar Mass poly(L-lactide)

5.03 g of the linked copolymer of Example 5 was reactively blended with 45.08 g of linear high-molar mass poly(L-lactide) in a Brabender W50EHT 3-zone mixer at 190° C. for 5 minutes, after which the sample was retained and cooled under ambient conditions. The reactive blending was initiated using 0.19 g of dicumyl peroxide (Aldrich, 98%, used as received). The sample obtained by reactive blending showed a $M_n$ of 16.1 kDa, $M_w$ of 104.1 kDa, and a $M_z$ of 202.9 kDa. The measured glass transition temperature was 48.3° C. A film prepared from the sample showed a tensile stress at maximum load of 51.5 MPa, which is lower than the tensile stress at maximum load for a similar film made of linear high-molar mass poly(L-lactide) (70.9 MPa).

Example 13

Example 13.a

Reactively Blending the Linked Copolymer of Example 6 with Linear High-Molar Mass poly(L-lactide)

8.20 g of the linked copolymer of Example 6 was reactively blended with 40.00 g of linear high-molar mass poly(L-lactide) in a Brabender W50EHT 3-zone mixer at 190° C. for 10 minutes, after which the sample was retained and cooled under ambient conditions. The reactive blending was initiated using 0.18 g of dicumyl peroxide (Aldrich, 98%, used as received). The sample obtained by reactive blending showed a $M_w$ of 163.7 kDa and a $M_z/M_n$ of 46.7. The measured glass transition temperature was 47.0° C.

Example 13.b

Blending the Linked Copolymer of Example 6 with Linear High-Molar Mass poly(L-lactide)

8.54 g of the linked copolymer of Example 6 was blended with 40.00 g of linear high-molar mass poly(L-lactide) in a Brabender W50EHT 3-zone mixer at 190° C. for 10 minutes, after which the sample was retained and cooled under ambient conditions. The sample obtained by simple blending showed a $M_w$ of 107.0 kDa and a $M_z/M_n$ of 9.1 The measured glass transition temperature was 48.5° C.

Example 14

Example 14.a

Reactively Blending the Linked Copolymer of Example 7 with Linear High-Molar Mass poly(L-lactide)

9.90 g of the linked copolymer of Example 7 was reactively blended with 40.04 g of linear high-molar mass poly(L-lactide) in a Brabender W50EHT 3-zone mixer at 190° C. for 9 minutes, after which the sample was retained and cooled under ambient conditions. The reactive blending was initiated using 0.18 g of dicumyl peroxide (Aldrich, 98%, used as received). The sample obtained by reactive blending showed a $M_w$ of 105.5 kDa and a $M_z$ of 239.6 kDa. The measured glass transition temperature was 46.2° C.

Example 14.b

Blending the Linked Copolymer of Example 7 with Linear High-Molar Mass poly(L-lactide)

9.93 g of the linked copolymer of Example 7 was blended with 40.01 g of linear high-molar mass poly(L-lactide) in a Brabender W50EHT 3-zone mixer at 190° C. for 9 minutes, after which the sample was retained and cooled under ambient conditions. The sample obtained by simple blending showed a $M_w$ of 69.2 kDa and a $M_z$ of 177.5 kDa. The measured glass transition temperature was 48.5° C.

Example 15

Example 15.a

Reactively Blending the Linked Copolymer of Example 6 with Linear High-Molar Mass poly(L-lactide)

The linked copolymer of Example 6 was reactively blended with linear high-molar mass poly(L-lactide) using the amounts as indicated in Table 1. The reactive blending was performed in a Brabender W50EHT 3-zone mixer at 190° C. for ca. 8 minutes, after which the samples were retained and cooled under ambient conditions before analyses. The reactive blending was initiated using Trigonox 301 peroxide (Akzo-Nobel, used as received). In Table 1, the $M_z$ of the different samples is tabulated.

TABLE 1

| Amount Copolymer of Example 6 [g] | Amount Linear Poly(L-lactide) [g] | Amount Trigonox 301 [g] | $M_z$ [kDa] |
| --- | --- | --- | --- |
| 5.56 | 45.00 | 0.16 | 228.8 |
| 10.75 | 40.03 | 0.19 | 272.8 |
| 14.70 | 35.00 | 0.18 | 281.7 |

Example 15.b

Blending the Linked Copolymer of Example 6 with Linear High-Molar Mass poly(L-lactide)

The linked copolymer of Example 6 was blended with linear high-molar mass poly(L-lactide) using the amounts as indicated in Table 2. The blending was performed in a Brabender W50EHT 3-zone mixer at 190° C., after which the samples were retained and cooled under ambient conditions before analyses. In Table 2, the $M_z$ of the different samples is tabulated.

TABLE 2

| Amount Copolymer of Example 6 [g] | Amount Linear Poly(L-lactide) [g] | $M_z$ [kDa] |
| --- | --- | --- |
| 4.68 | 45.00 | 188.4 |
| 14.85 | 35.02 | 175.0 |

Example 16

Example 16.a

Reactively Blending the Linked Copolymer of Example 5 with Linear High-Molar Mass poly(L-lactide)

The linked copolymer of Example 5 was reactively blended with linear high-molar mass poly(L-lactide) using the amounts as indicated in Table 3. The reactive blending was performed in a Brabender W50EHT 3-zone mixer at 190° C. for ca. 8 minutes, after which the samples were retained and cooled under ambient conditions before analyses. The reactive blending was initiated using Trigonox 301 peroxide (Akzo-Nobel, used as received). In Table 3, the molecular weight distribution of the samples is tabulated.

TABLE 3

| Amount Copolymer of Example 5 [g] | Amount Linear Poly(L-lactide) [g] | Amount Trigonox 301 [g] | $M_w/M_n$ |
| --- | --- | --- | --- |
| 4.65 | 45.04 | 0.19 | 20.4 |
| 9.24 | 40.04 | 0.19 | 23.4 |
| 14.66 | 35.05 | 0.18 | 40.9 |

Example 16.b

Blending the Linked Copolymer of Example 5 with Linear High-Molar Mass poly(L-lactide)

The linked copolymer of Example 5 was blended with linear high-molar mass poly(L-lactide) using the amounts as indicated in Table 4. The blending was performed in a Brabender W50EHT 3-zone mixer at 190° C., after which the samples were retained and cooled under ambient conditions before analyses. In Table 4, the molecular weight distribution of the samples is tabulated.

TABLE 4

| Amount Copolymer of Example 5 [g] | Amount Linear Poly(L-lactide) [g] | $M_w/M_n$ |
| --- | --- | --- |
| 5.35 | 45.06 | 35.9 |
| 9.72 | 40.08 | 22.4 |
| 14.44 | 35.03 | 7.8 |

Example 17

Example 17.a

Reactively Blending the Linked Copolymer of Example 2 with Linear High-Molar Mass poly(L-lactide)

8.00 g of the linked copolymer of Example 2 was reactively blended with 32.00 g of linear high-molar mass poly(L-lactide) in a Brabender W50EHT 3-zone mixer at 190° C. Samples were retained at different times and the samples cooled under ambient conditions before analyses. The reactive blending was initiated using 0.14 g of Trigonox 301 peroxide (Akzo-Nobel, used as received). In Table 5, the molecular weight distributions are tabulated against the predetermined blending time.

TABLE 5

| Blending Time [min] | $M_w/M_n$ |
| --- | --- |
| 2 | 22.0 |
| 3 | 30.1 |
| 4 | 39.5 |
| 6 | 57.7 |
| 7 | 69.8 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A crosslinked lactic acid polymer composition, comprising:
   (i) a macromer comprising (i-a) a flexible segment produced by the condensation of two or more compounds selected from the group consisting of lactones, furans, epoxies, isocyanates, anhydrides, dianhydrides, alcohols, diols, triols, carboxylic acids, dicarboxylic acids, tricarboxylic acids, esters, diesters, triesters, ethers, diethers, and triethers, and (i-b) a lactic acid segment produced by the condensation of a lactic acid monomer or dimer selected from the group consisting of D-lactic acid, L-lactic acid, D,L-lactic acid, L,L-lactide, D,D-lactide, and D,L-lactide with a polyfunctional monomer selected from the group consisting of dianhydrides, diols, triols, dicarboxylic acids, and tricarboxylic acids; and
   (ii) a lactic acid polymer produced by the condensation of a lactic acid monomer or dimer selected from the group consisting of D-lactic acid, L-lactic acid, D,L-lactic acid, L,L-lactide, D,D-lactide, and D,L-lactide;
   wherein the macromer and the lactic acid polymer contain carbon-carbon single-bond crosslinks and the dispersion index (Mw/Mn) of the crosslinked lactic acid polymer is from about 10 to about 70.

2. The crosslinked lactic acid polymer composition of claim 1, wherein the polyfunctional monomer is maleic anhydride.

3. The crosslinked lactic acid polymer composition of claim 1, wherein the flexible segment (i-a) is produced by the condensation of reactants selected from the group consisting of (i-a-1) adipic acid and 1,4-butanediol; (i-a-2) adipic acid, 1,4-butanediol, and maleic anhydride; (i-a-3) tetrahydrofuran and maleic anhydride; and (i-a-4) ε-caprolactone and maleic anhydride.

4. The crosslinked lactic acid polymer composition of claim 3, wherein the flexible segment (i-a) is produced by the condensation of from about 25 weight parts to about 75 weight parts adipic acid, from about 20 weight parts to about 60 weight parts 1,4-butanediol, and from about 5 weight parts to about 15 weight parts maleic anhydride.

5. The crosslinked lactic acid polymer composition of claim 1, wherein the macromer is the condensation product of from about 20 weight parts to about 80 weight parts lactic acid segment with about 20 weight parts to about 80 weight parts flexible segment.

6. The crosslinked lactic acid polymer composition of claim 1, wherein the composition comprises from about 10 weight parts to about 90 weight parts lactic acid polymer (ii) and from about 10 weight parts to about 90 weight parts macromer (i) and the macromer (i) and the lactic acid polymer (ii) together comprise 100 weight parts.

7. The crosslinked lactic acid polymer composition of claim 6, wherein the composition comprises from about 60 weight parts to about 80 weight parts lactic acid polymer (ii) and from about 20 weight parts to about 40 weight parts macromer (i) and the macromer (i) and the lactic acid polymer (ii) together comprise 100 weight parts.

* * * * *